US005991141A

United States Patent [19]

Mikli et al.

[11] Patent Number: 5,991,141

[45] Date of Patent: Nov. 23, 1999

[54] SURGE ARRESTER ARRANGED TO PROVIDE FAILURE INDICATION

[75] Inventors: Norbert Mikli, Ebersberg; Steffen Bohrisch, Hermsdorf/Thüringen, both of Germany

[73] Assignee: Raychem GmbH, Ottobrunn, Germany

[21] Appl. No.: 09/066,302

[22] PCT Filed: Nov. 7, 1996

[86] PCT No.: PCT/GB96/02734

§ 371 Date: Apr. 28, 1998

§ 102(e) Date: Apr. 28, 1998

[87] PCT Pub. No.: WO97/17708

PCT Pub. Date: May 15, 1997

[30] Foreign Application Priority Data

Nov. 8, 1995 [GB] United Kingdom ................... 9522875

[51] Int. Cl.$^{6}$ ................................................ H02H 9/04

[52] U.S. Cl. ........................... 361/127; 361/117; 361/132

[58] Field of Search .................................... 361/111, 117, 361/131, 118, 124, 125, 128, 127, 126, 132, 134, 136; 337/30, 31

[56] References Cited

U.S. PATENT DOCUMENTS

| | | | |
|---|---|---|---|
| 3,886,411 | 5/1975 | Klayum | 361/119 |
| 4,493,003 | 1/1985 | Mickelson et al. | 361/119 |
| 4,710,847 | 12/1987 | Kortschinski et al. | 361/125 |
| 4,930,039 | 5/1990 | Woodworth et al. | 361/127 |
| 5,191,503 | 3/1993 | Kawamura et al. | 361/127 |
| 5,237,482 | 8/1993 | Osterhout et al. | 361/117 |
| 5,583,734 | 12/1996 | McMills et al. | 361/124 |

FOREIGN PATENT DOCUMENTS

| | | | |
|---|---|---|---|
| WO 93/01641 | 1/1993 | WIPO | H02H 9/04 |

*Primary Examiner*—Albert W. Paladini
*Assistant Examiner*—Kim Huynh
*Attorney, Agent, or Firm*—Marguerite E. Gerstner; Yaun Chao; Herbert G. Burkard

[57] ABSTRACT

A failure indicator device for a surge arrester (2) employs a conventional explosive disconnector (10). Operation of the disconnector (10) due to earth fault current passing through the arrester (2) causes an arc to be formed. Movement of the disconnector (10) away from the arrester (2) is guided and limited by a support arrangement (18, 20) that subsequently provides a solid and permanent conductive path to earth (6) from the arrester terminal (12), thus extinguishing the arc.

15 Claims, 3 Drawing Sheets

SURGE ARRESTER ARRANGED TO PROVIDE FAILURE INDICATION

BACKGROUND OF THE INVENTION

1. Field of the Invention

This invention relates to surge arresters, and in particular to assemblies comprising a surge arrester that are arranged to provide an indication in the event of their failure.

2. Introduction to the Invention

Surge arresters, sometimes referred to as surge diverters, are devices arranged to protect other electrical equipment, usually in the distribution and supply of electric power, from an excessively high, and thus usually damaging, electric voltage, caused, for example, by a lightning strike. The surge arrester is electrically connected between the equipment at high voltage, say 5 kV or higher, and earth potential, and is electrically insulating in the absence of the overvoltage, that is to say a voltage in excess of that which can be withstood by the associated equipment. On occurrence of an overvoltage, the surge arrester becomes conductive so as safely to divert the consequent current to earth. The arrester then reverts to its insulating condition.

In some instances, however, a lightning strike may occur so close to a surge arrester that the electrical power that flows through the arrester is so intense as to damage it, in extreme cases totally destroying it. In less extreme cases, the damage may result in the formation of a continuous current path to earth. A surge arrester can also be subject to other fault conditions. Faults can arise in power distribution networks in which a relatively low fault current, of say 10 amps, flows for a relatively short time between high voltage and earth through the surge arrester. This can occur in particular in networks employing isolated neutral conductors, neutral conductors with impedance grounding, and those with uni-grounded neutral conductors associated with very high grounding resistance at a remote location. In such cases, the surge arrester can fail internally but with no external evidence of damage, so that visual identification of the failed arrester by service personnel is difficult.

Disconnectors are sometimes employed to isolate a failed arrester from the voltage applied thereto or from earth. The disconnector is arranged, upon detection of a predetermined fault condition, usually a flow of a minimum current for a minimum time, physically to separate from the surge arrester, thus interrupting the path to earth. An arc is initially drawn, but is extinguished as the disconnector moves further away. However, unless visual inspection of every surge arrester in the network is to be made after each temporary phase-to-ground fault, the network will continue to operate in a condition with a failed and disconnected arrester, and thus at a reduced safety level. This can arise because earth faults on an overhead power line, for example, are fairly common. The earth fault, that is to say the operation of the disconnector, is detected at the system control room and a circuit breaker switches off the power supply and after a short time switches the power on again. If the fault were a temporary one, the system would then continue in its powered state. The earth fault may have arisen at any part of the system, not at all necessarily associated with a surge arrester. Thus the fact that the fault has cleared provides no motivation for a linesman to be sent to check on the condition of all the surge arresters.

WO-A-93/01641 (Joslyn Corporation) discloses a high voltage surge arrester with a failed surge arrester signalling device. In this arrangement, if the arrester fails, the disconnector disengages and provides a visible indication that the arrester has failed, and at the same time the connection to the surge arrester is re-established by a further conductor, thereby to maintain a conductive path between the surge arrester and earth potential. Upon explosive separation of the disconnector from the arrester, the disconnector remains attached to the arrangement only by a flexible conductor, and forms no part of the re-connection circuit. The further conductor, which establishes the re-connection to the surge arrester, is formed from a resilient member that is released from tension by the departing disconnector and which establishes re-connection back to the surge arrester by means of its resilience. In some circumstances, such as flow of high current, which can generate high repulsive mechanical forces, such resilient force may not be sufficient to maintain good electrical connection.

SUMMARY OF THE INVENTION

It is one object of the present invention to provide a surge arrester assembly that overcomes, or at least alleviates, these disadvantages of known arrangements in a particularly convenient manner.

Thus, in accordance with one aspect of the present invention, there is provided a surge arrester assembly comprising:

(a) a surge arrester having (i) a first terminal for connection, in use, to a remote second terminal at a first electric potential, and (ii) a third terminal for connection, in use, to a remote fourth terminal at a second electric potential, which is different from said first potential, wherein, in use, the first terminal is at a location that is vertically lower than said third terminal;

(b) means arranged, in operation, electrically to connect the first terminal of the surge arrester to said second terminal, said connection means being arranged to be physically disconnected from the first terminal in response to a predetermined fault condition of the surge arrester; and (c) re-connection means arranged to provide, subsequent to said disconnection, a solid electrically conductive path from said first terminal of the surge arrester to said second terminal; wherein (d) the re-connection means is arranged to guide the connection means, upon disconnection, away from the surge arrester and to support the connection means at a location that is vertically lower than said first terminal.

DETAILED DESCRIPTION OF THE INVENTION

The pre-determined fault condition may be characterised by a flow of current in excess of 15 amps for a time in excess of 0.5 seconds, for example.

Preferably, the connection means comprises an insulated elongate conductive member that is in direct electrical contact with the first terminal of the surge arrester until disconnection takes place, and which, subsequent thereto, makes electrical contact with said re-connection means.

Advantageously, upon disconnection, the connection means is guided through a fifth terminal that forms part of the support structure of the re-connection means and that is electrically connected to the first terminal of the surge arrester, such that when the connection means is supported by the re-connection means, the conductive member thereof is in electrical contact with the fifth terminal.

Preferably, at least that portion of the connection means that extends through the fifth terminal prior to disconnection is rigid.

Preferably, the connection means has a tapering outer circumferential surface and, subsequent to disconnection, is supported in a tapering aperture of the re-connection means, the respective angles of taper being different from one another. In such a construction, as opposed to one in which the angles of taper are substantially the same, when the fault has been repaired, the connection means can be easily removed from the support member of the re-connection means.

Usually, the first, lower, terminal of the surge arrester will be substantially at earth potential, and the second terminal will be an earthing point, whilst the third, upper, terminal will be at the high voltage (say 1 kV or above) of the fourth terminal, which may form part of electrical equipment, for example being an overhead power distribution conductor. Accordingly, hereinafter for convenience, and in a non-limiting manner, reference will be made to connection with respect to earth potential.

The assembly of the present invention thus provides a disconnection function in the event of failure of the arrester. Separation of the earth connecting means from the earthing terminal of the arrester then leads to formation of an arc. The subsequent provision of a solid, that is to say non-gaseous, and permanent conductive path to earth from the terminal causes the arc to be extinguished and the fault current to flow to earth along that path. It is particularly advantageous that it is the earth connecting means itself that not only responds to the fault by becoming physically disconnected from the surge arrester terminal but then subsequently forms part of the solid path to earth. The fact that the fault current is maintained even though the arc produced by interruption of the earth connecting means has been extinguished, will prevent the associated circuit breaker permanently switching back on the power supply to the equipment. Thus, a linesman must then be sent to identify and replace the failed arrester, before power can be restored, ensuring the safety of the electrical system.

Preferably, the earth connecting means is movable, in response to said fault condition, between a first position in which it is physically attached to the surge arrester and a second position in which it is supported on a member spaced apart from said surge arrester terminal. Usually when a conventional disconnector is employed, it hangs freely down from the surge arrester after its operation, as disclosed in WO-A-93/01641. By arranging for the disconnection to take place from the lower terminal of the surge arrester, the force of gravity will ensure effectiveness of the separating movement. Furthermore, by guiding the connection means to a specific support member as it disconnects, it can be ensured that the arc drawn between the first surge arrester terminal and the receding disconnector is properly extinguished. The subsequent positive support and retention of the disconnector enhances the integrity of the re-established, solid conductive path and minimises the danger of a free-moving disconnector accidently reestablishing an arc to the surge arrester terminal.

It is to be understood that the first terminal of the surge arrester in being located vertically lower than the third terminal, need not be directly vertically below it. That is to say, the orientation of the surge arrester need not be substantially vertical, although this may be its conventional orientation, but it may be inclined to the vertical, with disconnection being arranged to take place from the lower of its two terminals. In the event that the arrester is mounted substantially horizontally, disconnection may take place from either of its terminals, and either one may then be regarded as being at a location that is vertically lower than the other.

The support member advantageously is electrically connected to the arrester terminal, so as to provide the solid conductive path.

Preferably, at least a portion of the earth connecting means is rigid and is guided by the support member in its movement between said two positions. Advantageously, the rigid portion of the earth connecting means comprises an insulated conductive elongate member that extends through an aperture in the support member.

The surge arrester itself may be of any suitable construction. For example, the surge arresting elements may comprise a plurality of varistor blocks, comprising zinc oxide material for example. The surge arresting elements are contained within an outer insulating housing, which is preferably formed of polymeric material, which may be heat shrunk into place. The housing may be provided with one or more sheds, so as to enhance the length of the earth leakage path between the terminals of the arrester and to shed liquid pollution therefrom.

Surge arrester assemblies, in accordance with the present invention, will now be described, by way of example, with reference to the accompanying drawings, in which:

DETAILED DESCRIPTION OF THE DRAWINGS

Figure 3:
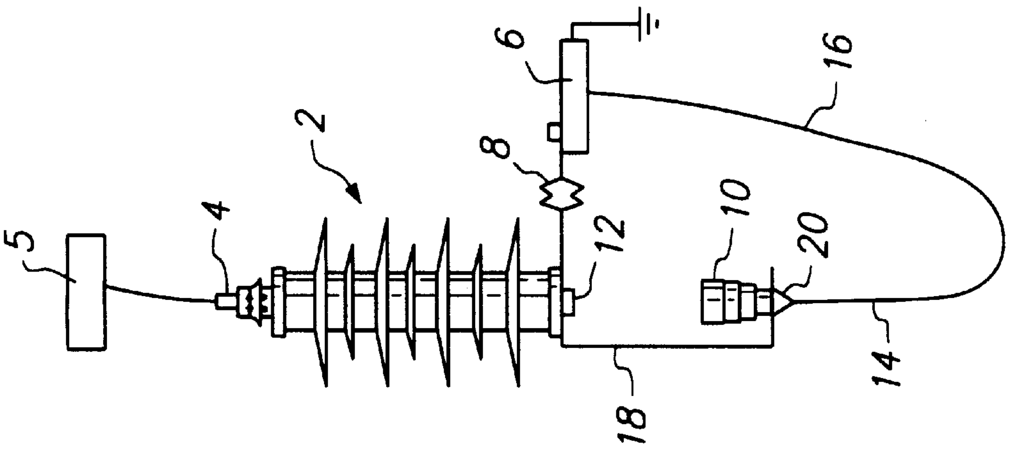
FIG. 3 shows the assembly of FIG. 1 in its final post-fault configuration, FIGS. 4A and 4B shown schematically in enlarged detail a further assembly having a modified disconnection arrangement respectively before and after operation.
Figure 2:
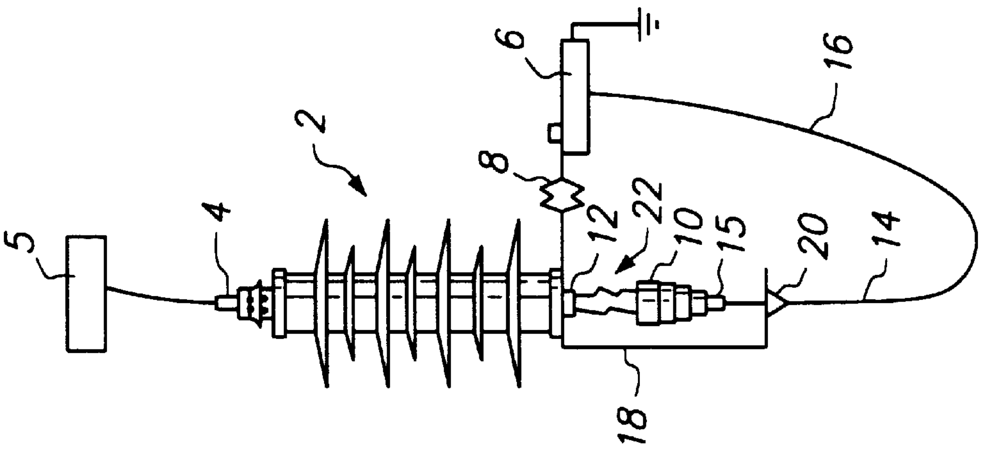
FIG. 2 shows the assembly of FIG. 1 just after a fault has occurred.

Referring to the drawings, a shedded polymeric surge arrester 2 has an upper terminal 4 connected to remote second terminal 5 which may be part of high voltage equipment (not shown). At its lower end, the arrester 2 is physically supported by an earthed block 6, being spaced therefrom by an insulator 8. A disconnector 10 is mounted at the lower end of the arrester 2 in electrical connection with the lower, earthing, terminal 12 of the arrester (FIGS. 2, 3). A rigid insulated conductive rod 14 extends down from a terminal 15 of the disconnector 10, which is connected to the terminal 12, and is connected by a flexible conductor 16 to the earthed block 6, thereby to provide earthing for the arrester terminal 12.

An insulated conductive bracket 18 is mounted at the lower end of the surge arrester 2 in electrical connection with the earthing terminal 12. The bracket 18 extends down from the arrester 2 in an L-shape so as to dispose an electrode 20 directly beneath the disconnector 10. The insulated rod 14 extends through an aperture in the electrode 20.

Figure 1:
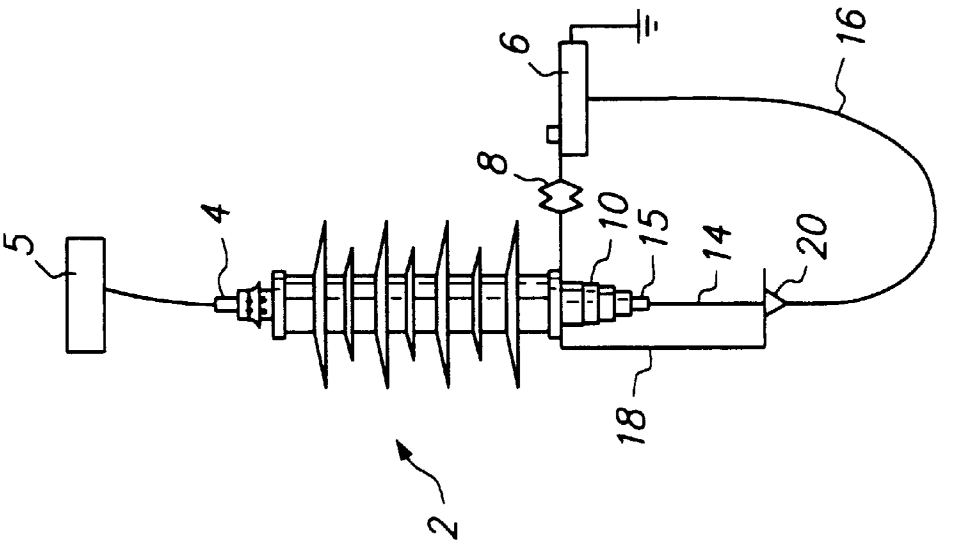
FIG. 1 shows an elevation of an assembly in its normal passive configuration.

As indicated by FIG. 1, the high voltage equipment (not shown) connected to the high voltage terminal 4 of the surge arrester 2, and the surge arrester 2 itself, are functioning normally. That is to say, the arrester 2 is acting as an insulator, and no current is flowing to earth at the block 6.

In the event of a fault in the arrester 2, a fault current flows through the surge arrester 2, is sensed by the disconnector 10 as it passes therethrough, and then to earth at the block 6 via the rod 14 and the flexible conductor 16. The disconnector 10 operates to eject itself away from the surge arrester (FIG. 2). An electric arc 22 is drawn between the earthing terminal 12 of the surge arrester and the receding disconnector 10. The disconnector 10 is guided in its movement by the sliding passage of the rigid insulated rod 14 through the electrode 20 on the supporting bracket 18.

Movement of the disconnector 10 is stopped by its engagement with the bracket 18 (FIG. 3). In this position, good electrical contact is established between the lower terminal 15 of the disconnector 10 which fits into the bracket electrode 20. A solid and permanent electrically conductive path is thus now established from the earthing terminal 12 of the surge arrester, through the support bracket 18 to its electrode 20, then via the disconnector terminal 15 and insulated rod 14 and flexible conductor 16 to the earthed block 6. Since the impedance of this path is less than that to earth through the arc 22, the arc is extinguished and all the fault current passes along the solid path.

The continuous flow of current through the surge arrester to earth will now prevent the circuit breaker associated with the high voltage equipment and its power supply from re-establishing the supply of power. The failed surge arrester will thus have to be replaced, thus maintaining the electrical safety of the system.

Figure 4B:
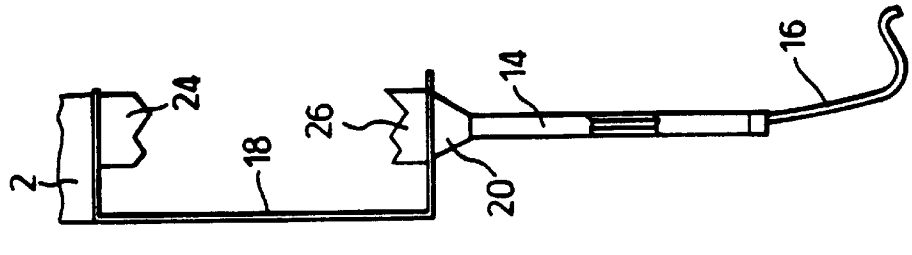
Figure 4A:
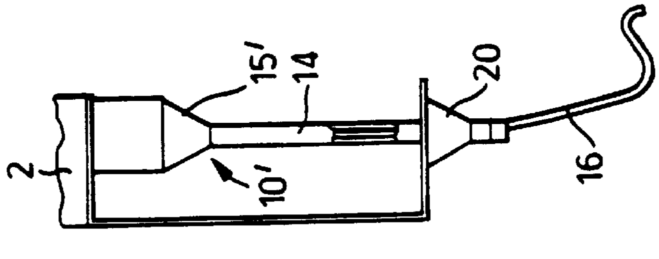

FIGS. 4A and 4B show a slightly modified form of disconnection arrangement 10', in which its lower terminal 15' is of frusto-conical shape to provide a stable mating engagement within the bracket electrode 20. FIG. 4B shows the disconnector 10' after it has operated, with an upper part 24 still attached to the surge arrester 2 and the lower part 26 spaced therefrom and supported on the bracket 18. The insulation of the rod 14 is partially cutaway to reveal the enclosed conductive member.

Figure 5B:
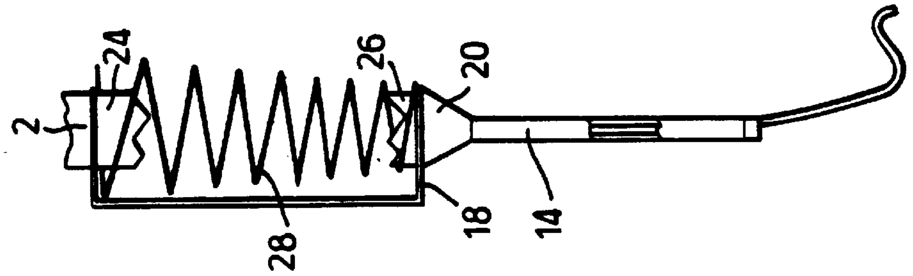
FIGS. 5A and 5B show a still further assembly having a differently-modified disconnection arrangement.
Figure 5A:
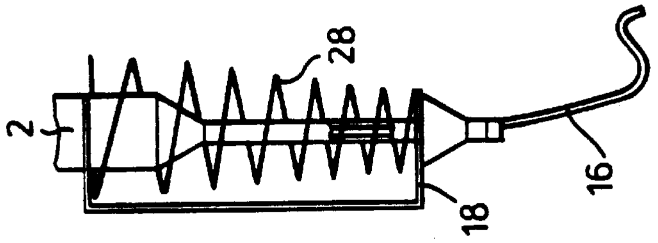

FIGS. 5A and 5B show a modification of the disconnector 10' of FIGS. 4A and 4B, in which an insulating, or insulated, helical coil 28 is shown schematically located between the surge arrester 2 and the lower arm of the bracket 18 so as to act as a guide for the movement of the rod 14 and lower part 26 of the disconnector as it separates from its upper part 24. The open structure of the guide 28 allows any fragments from the disintegrating disconnector 10' to pass therethrough.

Figure 6B:
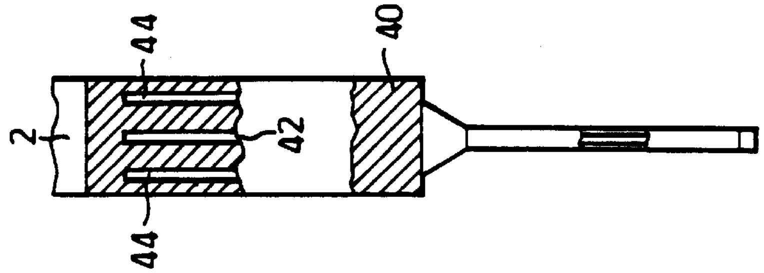
FIGS. 6A and 6B show a yet further assembly having a differently-modified disconnection arrangement.
Figure 6A:
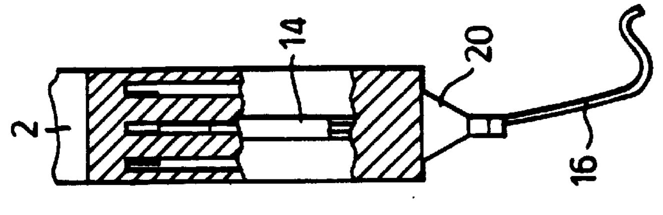

FIGS. 6A and 6B show a further modification of the disconnection arrangement in which an insulating vented tube 40 depends downwards from the surge arrester 2 and supports the electrode 20. The insulated rod 14 extends upwardly out of the bracket electrode 20, as can be seen in the cutaway portion of the tube 40, and is guided in a channel 42 of the tube 40. The channel 42 and other channels 44 are vented to the exterior to allow explosive gases to pass out of the tube 40 on occurrence of the disconnection.

Figure 7:
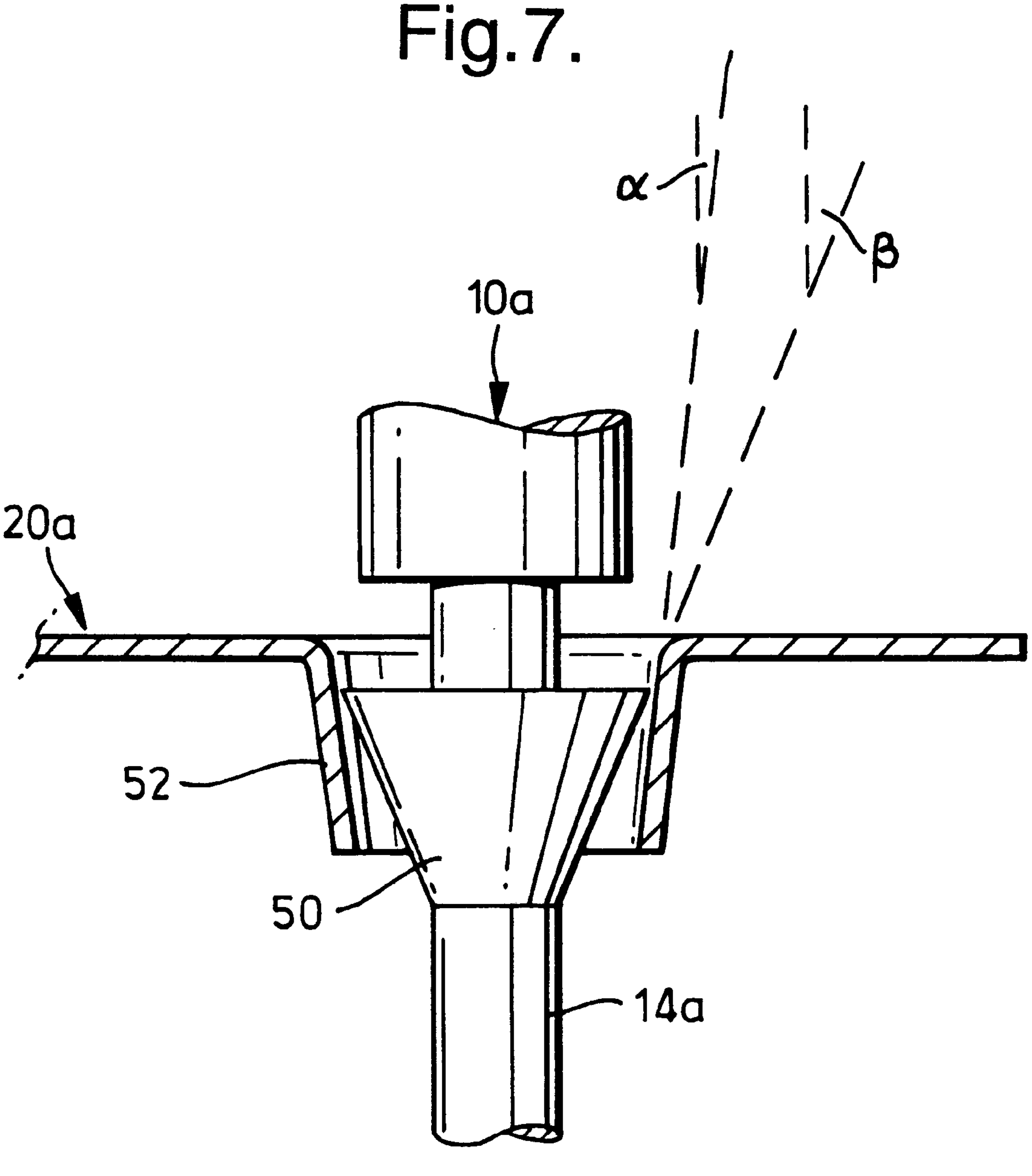
FIG. 7 shows an enlarged detail of a further modification of the assembly of FIGS. 1 to 3.

Referring to FIG. 7, the enlarged detail of a modification of the assembly 2 in its disconnected state (FIG. 3) mounted on a support structure, shows the lower end of a disconnector 10*a*, its terminal 15*a* and a frustoconical conductive portion 50 of cone angle $\beta$ extending therefrom, the portion 50 leading to a rigid insulated conductive rod 14*a*. The support bracket is provided with an electrode 20*a* in the form of a frustoconical aperture 52 of cone angle $\alpha$. The configurations are arranged so that $\alpha \neq \beta$, and, as shown, $\alpha > \beta$, whereby only line contact exists between the components 50, 52 rather than the surface contact that would exist if $\alpha = \beta$. Subsequent separation of the disconnector 10*a* from the support bracket is thus facilitated.

What is claimed is:

1. A surge arrester assembly comprising (a) a surge arrester having (i) a first terminal for connection, in use, to a remote second terminal at a first electric potential, and (ii) a third terminal for connection, in use, to a remote fourth terminal at a second electric potential, which is different from said first potential, wherein, in use, the first terminal is at a location that is vertically lower than said third terminal;

(b) connection means arranged, in operation, electrically to connect the first terminal of the surge arrester to said second terminal, said connection means (i) being arranged to be physically disconnected from the first terminal in response to a predetermined fault condition of the surge arrester, and (ii) comprising an insulated elongate conductive member that is in direct electrical contact with the first terminal of the surge arrester until disconnection takes place; and (c) re-connection means arranged to provide, subsequent to said disconnection, a solid electrically conductive path from said first terminal of the surge arrester to said second terminal;

wherein (1) the re-connection means is arranged to guide the connection means, upon disconnection, away from the surge arrester and to support the connection means at a location that is vertically lower than said first terminal, (2) the connection means, subsequent to disconnection, makes electrical contact with said re-connection means, and (3) upon disconnection, the connection means is guided through a fifth terminal that forms part of the support structure of the re-connection means and is electrically connected to the first terminal of the surge arrester, such that when the connection means is supported by the re-connection means, the conductive member thereof is in electrical contact with the fifth terminal.

2. An assembly according to claim 1, wherein at least that portion of the connection means that extends through the fifth terminal prior to disconnection is rigid.

3. An assembly according to claim 2, wherein the connection means has a tapering outer circumferential surface and, subsequent to disconnection, is supported in a tapering aperture of the re-connection means, the respective angles of taper being different from one another.

4. An assembly according to claim 2, wherein said second terminal is substantially at earth potential and said fourth terminal forms part of electrical equipment at high voltage, whereby the connection means is arranged to connect the first terminal of the surge arrester to earth potential.

5. An assembly according to claim 2, wherein the surge arrester comprises a plurality of varistor blocks disposed within an insulating housing.

6. An assembly according to claim 5, wherein the outer surface of the surge arrester housing is of shedded configuration.

7. An assembly according to claim 1, wherein the connection means has a tapering outer circumferential surface and, subsequent to disconnection, is supported in a tapering aperture of the re-connection means, the respective angles of taper being different from one another.

8. An assembly according to claim 1, wherein said second terminal is substantially at earth potential and said fourth terminal forms part of electrical equipment at high voltage, whereby the connection means is arranged to connect the first terminal of the surge arrester to earth potential.

9. An assembly according to claim 1, wherein the surge arrester comprises a plurality of varistor blocks disposed within an insulating housing.

10. An assembly according to claim 9, wherein the outer surface of the surge arrester housing is of shedded configuration.

11. A surge arrester assembly comprising (a) a surge arrester having (i) a first terminal for connection, in use, to a remote second terminal at a first electric potential, and (ii) a third terminal for connection, in use, to a remote fourth terminal at a second electric potential, which is different from said first potential, wherein, in use, the first terminal is at a location that is vertically lower than said third terminal;

(b) connection means arranged, in operation, electrically to connect the first terminal of the surge arrester to said second terminal, said connection means (i) having a tapering outer circumferential surface and (ii) being arranged to be physically disconnected from the first terminal in response to a predetermined fault condition of the surge arrester; and (c) re-connection means arranged to provide, subsequent to said disconnection, a solid electrically conductive path from said first terminal of the surge arrester to said second terminal;

wherein (1) the re-connection means is arranged to guide the connection means, upon disconnection, away from the surge arrester and to support the connection means at a location that is vertically lower than said first terminal, and (2) subsequent to disconnection, the connection means is supported in a tapering aperture of the re-connection means, the respective angles of taper being different from one another.

12. An assembly according to claim 11, wherein the connection means comprises an insulated elongate conductive member that is in direct electrical contact with the first terminal of the surge arrester until disconnection takes place, and which, subsequent to disconnection, makes electrical contact with the re-connection means.

13. A surge arrester assembly comprising (a) a surge arrester having (i) a first terminal for connection, in use, to a remote second terminal at a first electric potential which is substantially at earth potential, and (ii) a third terminal for connection, in use, to a remote fourth terminal at a second electric potential, which is different from said first potential, wherein (1) in use, the first terminal is at a location that is vertically lower than said third terminal, and (2) said fourth terminal forms part of electrical equipment at high voltage;

(b) connection means arranged, in operation, electrically to connect the first terminal of the surge arrester to said second terminal at earth potential, said connection means (i) being arranged to be physically disconnected from the first terminal in response to a predetermined fault condition of the surge arrester, and (ii) comprising an insulated elongate conductive member that is in direct electrical contact with the first terminal of the surge arrester until disconnection takes place; and (c) re-connection means arranged to provide, subsequent to said disconnection, a solid electrically conductive path from said first terminal of the surge arrester to said second terminal;

wherein (1) the re-connection means is arranged to guide the connection means, upon disconnection, a from the surge arrester and to support the connection means at a location that is vertically lower than said first terminal, and (2) the connection means, subsequent to disconnection, makes electrical contact with said re-connection means.

14. A surge arrester assembly comprising (a) a surge arrester (i) having a first terminal for connection, in use, to a remote second terminal at a first electric potential, (ii) having a third terminal for connection, in use, to a remote fourth terminal at a second electric potential, which is different from said first potential, wherein, in use, the first terminal is at a location that is vertically lower than said third terminal, and (iii) comprising a plurality of varistor blocks disposed within an insulating housing;

(b) connection means arranged, in operation, electrically to connect the first terminal of the surge arrester to said second terminal, said connection means (i) being arranged to be physically disconnected from the first terminal in response to a predetermined fault condition of the surge arrester, and (ii) comprising an insulated elongate conductive member that is in direct electrical contact with the first terminal of the surge arrester until disconnection takes place; and (c) re-connection means arranged to provide, subsequent to said disconnection, a solid electrically conductive path from said first terminal of the surge arrester to said second terminal;

wherein (1) the re-connection means is arranged to guide the connection means, upon disconnection, away from the surge arrester and to support the connection means at a location that is vertically lower than said first terminal, and (2) the connection means, subsequent to disconnection, makes electrical contact with said re-connection means.

15. An assembly according to claim 14, wherein the outer surface of the surge arrester housing is of shedded configuration.

* * * * *